(12) United States Patent
Yamagishi

(10) Patent No.: US 7,408,730 B2
(45) Date of Patent: Aug. 5, 2008

(54) REPRODUCING HEAD AND MAGNETIC DISK DRIVE

(75) Inventor: Michinaga Yamagishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 11/315,652

(22) Filed: Dec. 22, 2005

(65) Prior Publication Data

US 2006/0098322 A1    May 11, 2006

Related U.S. Application Data

(63) Continuation of application No. PCT/JP03/10752, filed on Aug. 26, 2003.

(51) Int. Cl.
*G11B 5/09* (2006.01)
*G11B 5/33* (2006.01)

(52) U.S. Cl. .................... 360/46; 360/322; 360/316; 360/315; 360/314

(58) Field of Classification Search .................. 360/322
See application file for complete search history.

(56) References Cited

U.S. PATENT DOCUMENTS 3,979,775 A * 9/1976 Schwarz ..................... 360/315
4,660,113 A * 4/1987 Nomura et al. ............. 360/327
5,079,663 A * 1/1992 Ju et al. ..................... 360/322
5,555,142 A * 9/1996 Komai et al. .............. 360/77.06
5,751,521 A * 5/1998 Gill ............................ 360/314
6,185,079 B1 * 2/2001 Gill ........................... 360/324.2
2006/0002032 A1 * 1/2006 Li et al. ...................... 360/315

FOREIGN PATENT DOCUMENTS

| JP | 59-033616 | 2/1984 |
| JP | 01-296422 | 11/1989 |
| JP | 10-149519 | 6/1998 |

* cited by examiner

*Primary Examiner*—Andrea Wellington
*Assistant Examiner*—Dan I Davidson
(74) *Attorney, Agent, or Firm*—Greer, Burns & Crain, Ltd.

(57) ABSTRACT

A reproducing head including a read element, first and second electrodes provided at the opposite ends of the read element, a ground electrode provided between the first and second electrodes, a first constant current circuit for passing a first constant current between the first electrode and the ground electrode, and a second constant current circuit for passing a second constant current between the second electrode and the ground electrode. The reproducing head further includes a computing unit connected to the first and second electrodes for synthesizing an output from the first electrode and an output from the second electrode, and a storing unit having a table showing the relation between a synthetic value computed by the computing unit and the outputs from the first and second electrodes.

10 Claims, 13 Drawing Sheets

REPRODUCING HEAD AND MAGNETIC DISK DRIVE

This is a continuation of PCT International Application No. PCT/JP03/10752, filed Aug. 26, 2003, which was not published in English.

BACKGROUND OF THE INVENTION

1. Field of the Invention

The present invention relates to a reproducing head and a magnetic disk drive using the reproducing head.

2. Description of the Related Art

In association with a reduction in size and an increase in recording density of a magnetic disk drive in recent years, the flying height of a head slider has become smaller and it has been desired to realize contact recording/reproduction such that the head slider flies a very small height above a recording medium or comes into contact with the recording medium. Further, a conventional magnetic induction head has a disadvantage such that its reproduction output decreases with a decrease in peripheral speed of a magnetic disk as the recording medium (relative speed between the head and the medium) caused by a reduction in diameter of the magnetic disk. To cope with this disadvantage, there has recently extensively been developed a magnetoresistive head (MR head) whose reproduction output does not depend on the peripheral speed and capable of obtaining a large output even at a low peripheral speed. Such a magnetoresistive head is now a dominating magnetic head. Further, a magnetic head utilizing a giant magnetoresistive (GMR) effect is also commercially available at present.

With higher-density recording in a magnetic disk drive, a recording area of one bit decreases and a magnetic field generated from the medium accordingly becomes smaller. The recording density of a magnetic disk drive currently on the market is about 40 Gbit/in$^2$, and it is rising at an annual rate of about 200%. It is therefore desired to develop a reproducing head which can support a minute magnetic field range and can sense a change in small external magnetic field.

At present, a spin valve magnetoresistive sensor utilizing a spin valve GMR effect is widely used in a magnetic head. The spin valve magnetoresistive sensor has a spin valve magnetoresistive film as a multilayer film including a free ferromagnetic layer (free layer) in which the direction of magnetization changes according to an external magnetic field, a nonmagnetic conductive layer formed adjacent to the free layer, a pinned ferromagnetic layer (pinned layer) formed adjacent to the nonmagnetic conductive layer, and an antiferromagnetic layer formed adjacent to the pinned layer for fixing the direction of magnetization in the pinned layer. The antiferromagnetic layer is formed of an antiferromagnetic material.

In the spin valve magnetoresistive film, a relative angle of the direction of magnetization in the free layer to the direction of magnetization in the pinned layer changes to produce a change in resistance. In the case that the direction of magnetization in the free layer is the same as the direction of magnetization in the pinned layer, the resistance becomes a minimum value, whereas in the case that the direction of magnetization in the free layer is opposite to the direction of magnetization in the pinned layer, the resistance becomes a maximum value. In the case of using this magnetoresistive sensor in a magnetic head, the magnetization direction in the pinned layer is fixed to a direction along the height of a magnetoresistive element, and the magnetization direction in the free layer in the condition where no external magnetic field is applied is generally designed to a direction along the width of the magnetoresistive element, which direction is perpendicular to the pinned layer. Accordingly, the resistance of the spin valve magnetoresistive film can be linearly increased or decreased according to whether the direction of the signal magnetic field from the magnetic recording medium is parallel or antiparallel to the magnetization direction of the pinned layer. Such a linear resistance change facilitates signal processing in the magnetic disk drive.

In the magnetoresistive head, a pair of electrode terminals are provided in relation to the magnetoresistive film, and a sense current as a constant current is passed from the pair of electrode terminals through the magnetoresistive film during operation of the magnetoresistive head. When the spin valve magnetoresistive head is relatively moved in proximity to a magnetic disk in the condition where the sense current is passed through the magnetoresistive film, the electrical resistance of the magnetoresistive film changes according to a signal magnetic field from the magnetic disk, and a reproduction signal having an output voltage represented as the product of this electrical resistance and the amperage of this sense current is output.

With an increase in recording density of a magnetic disk drive, the core width (sense region) of a read element formed between a pair of electrodes becomes smaller, and a manufacturing process for attaining such a smaller core width to be required becomes remarkably difficult. Accordingly, there are many problems including low yield and high cost.

SUMMARY OF THE INVENTION

It is therefore an object of the present invention to provide a reproducing head which can minimize the core width of a read element.

It is another object of the present invention to provide a magnetic disk drive which can attain high-speed reproduction of information recorded on a magnetic disk.

In accordance with an aspect of the present invention, there is provided a reproducing head including a read element; first and second electrodes provided at the opposite ends of the read element; a ground electrode provided between the first and second electrodes; first constant current means for passing a first constant current between the first electrode and the ground electrode; second constant current means for passing a second constant current different from the first constant current between the second electrode and the ground electrode; computing means connected to the first and second electrodes for synthesizing an output from the first electrode and an output from the second electrode; and storing means having a table showing the relation between a synthetic value computed by the computing means and the outputs from the first and second electrodes.

Preferably, the second constant current is twice the first constant current. Preferably, the computing means comprises a preamplifier and an A/D converter.

In accordance with another aspect of the present invention, there is-provided a reproducing head comprising a read element; first and second electrodes provided at the opposite ends of the read element; a ground electrode provided between the first and second electrodes; first constant current means for passing a first constant current between the first electrode and the ground electrode; second constant current means for passing a second constant current different from the first constant current between the second electrode and the ground electrode; and a selector connected to the first and second electrodes for selecting one of outputs from the first and second electrodes according to a track position signal.

In accordance with still another aspect of the present invention, there is provided a reproducing head comprising a read element; first and second electrodes provided at the opposite ends of the read element; a ground electrode provided between the first and second electrodes; at least one intermediate electrode provided between the first and second electrodes; a plurality of constant current means for passing different constant currents between the ground electrode and the first electrode, between the ground electrode and the second electrode, and between the ground electrode and the intermediate electrode; computing means connected to the first and second electrodes and the intermediate electrode for synthesizing outputs from the first and second electrodes and the intermediate electrode; storing means having a table showing the relation between a synthetic value computed by the computing means and the outputs from the first and second electrodes and the intermediate electrode; binary signal generating means connected to the intermediate electrode for generating a binary signal from the output from the intermediate electrode; and distinguishing means for inputting the binary signal to the storing means to distinguish addresses on the table in case that the synthetic value takes the same values.

Preferably, the different constant currents comprise a minimum constant current and an integral multiple thereof. Preferably, the computing means comprises a preamplifier and an A/D converter, and the binary signal generating means comprises an A/D converter and offset voltage applying means.

In accordance with a further aspect of the present invention, there is provided a magnetic disk drive comprising a housing; a magnetic disk rotatably accommodated in the housing, the magnetic disk having a plurality of tracks; a head slider having a recording head for writing data to the magnetic disk and a reproducing head for reading data from the magnetic disk; and an actuator for moving the head slider across the tracks of the magnetic disk; the reproducing head comprising a read element; first and second electrodes provided at the opposite ends of the read element; a ground electrode provided between the first and second electrodes; first constant current means for passing a first constant current between the first electrode and the ground electrode; second constant current means for passing a second constant current different from the first constant current between the second electrode and the ground electrode; computing means connected to the first and second electrodes for synthesizing an output from the first electrode and an output from the second electrode; and storing means having a table showing the relation between a synthetic value computed by the computing means and the outputs from the first and second electrodes.

In accordance with a still further aspect of the present invention, there is provided a magnetic disk drive comprising a housing; a magnetic disk rotatably accommodated in the housing, the magnetic disk having a plurality of tracks; a head slider having a recording head for writing data to the magnetic disk and a reproducing head for reading data from the magnetic disk; and an actuator for moving the head slider across the tracks of the magnetic disk; the reproducing head comprising a read element; first and second electrodes provided at the opposite ends of the read element; a ground electrode provided between the first and second electrodes; at least one intermediate electrode provided between the first and second electrodes; a plurality of constant current means for passing different constant currents between the ground electrode and the first electrode, between the ground electrode and the second electrode, and between the ground electrode and the intermediate electrode; computing means connected to the first and second electrodes and the intermediate electrode for synthesizing outputs from the first and second electrodes and the intermediate electrode; storing means having a table showing the relation between a synthetic value computed by the computing means and the outputs from the first and second electrodes and the intermediate electrode; binary signal generating means connected to the intermediate electrode for generating a binary signal from the output from the intermediate electrode; distinguishing means for inputting the binary signal to the storing means to distinguish addresses on the table in case that the synthetic value takes the same values.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
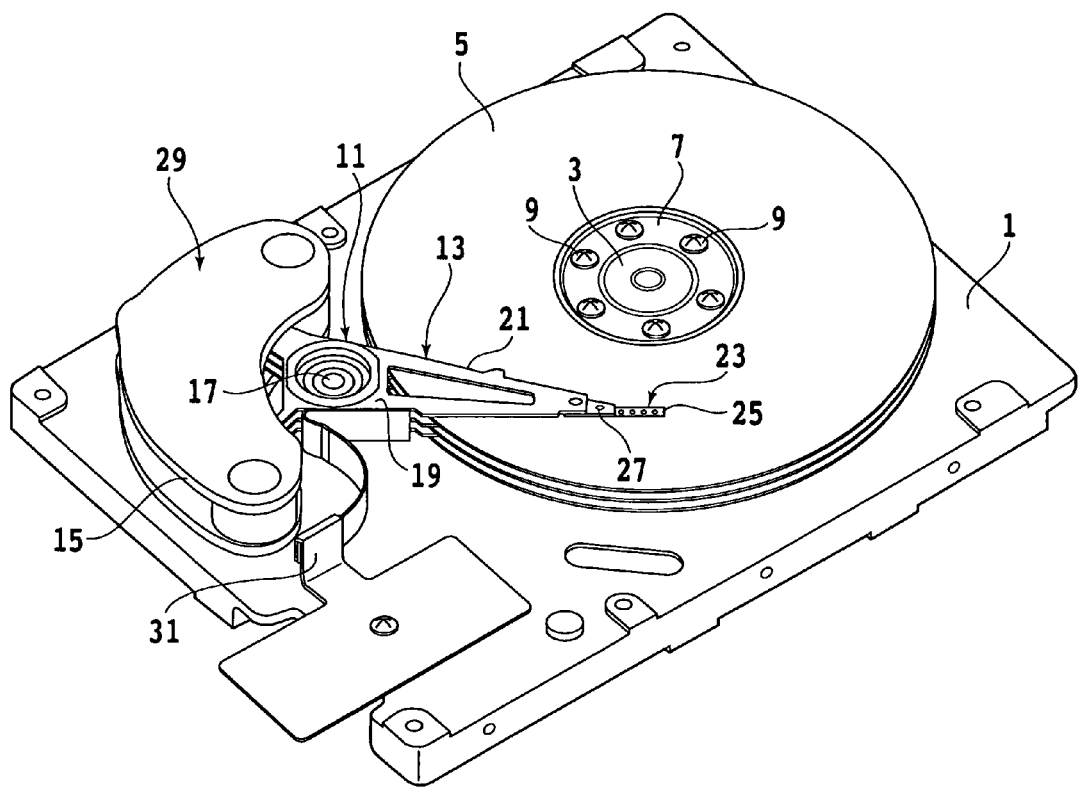
FIG. 1 is a perspective view of a magnetic disk drive in the condition where a cover is removed.

Referring to FIG. 1, there is shown a perspective view of a magnetic disk drive in the condition where a cover is removed. A shaft 3 is fixed to a base 1, and a spindle hub (not shown) is rotatably mounted on the shaft 3. The spindle hub is driven by a DC motor (not shown) to rotate about the shaft 3. A plurality of magnetic disks 5 and spacers (not shown) are mounted on the spindle hub so as to be alternately stacked. That is, the plural magnetic disks 5 are fixedly mounted on the spindle hub by securing a disk clamp 7 to the spindle hub by means of a plurality of screws 9, and are equally spaced a given distance by the spacers.

Reference numeral 11 denotes a rotary actuator consisting of an actuator arm assembly 13 and a magnetic circuit 15. The actuator arm assembly 13 is rotatable about a shaft 17 fixed to the base 1. The actuator arm assembly 13 includes an actuator block 19 rotatably mounted on the shaft 17 through a pair of bearings (not shown), a plurality of actuator arms 21 extending horizontally from the actuator block 19 in one direction, and a head assembly 23 fixed to a front end portion of each actuator arm 21.

Each head assembly 23 includes a head slider 25 having an electromagnetic transducer (magnetic head element) for reading/writing data from/to the corresponding magnetic disk 5, and a suspension 27 having a front end portion supporting the head slider 25 and a base end portion fixed to the corresponding actuator arm 21. A coil (not shown) is supported on the opposite side of the actuator arms 21 with respect to the shaft 17. The coil is inserted in a gap of the magnetic circuit 15. The magnetic circuit 15 and the coil constitute a voice coil motor (VCM) 29. Reference numeral 31 denotes a flexible printed circuit board (FPC) for supplying a write signal to the electromagnetic transducer and for taking a read signal from the electromagnetic transducer. One end of the flexible printed circuit board 31 is fixed to a side surface of the actuator block 19.

Figure 2:
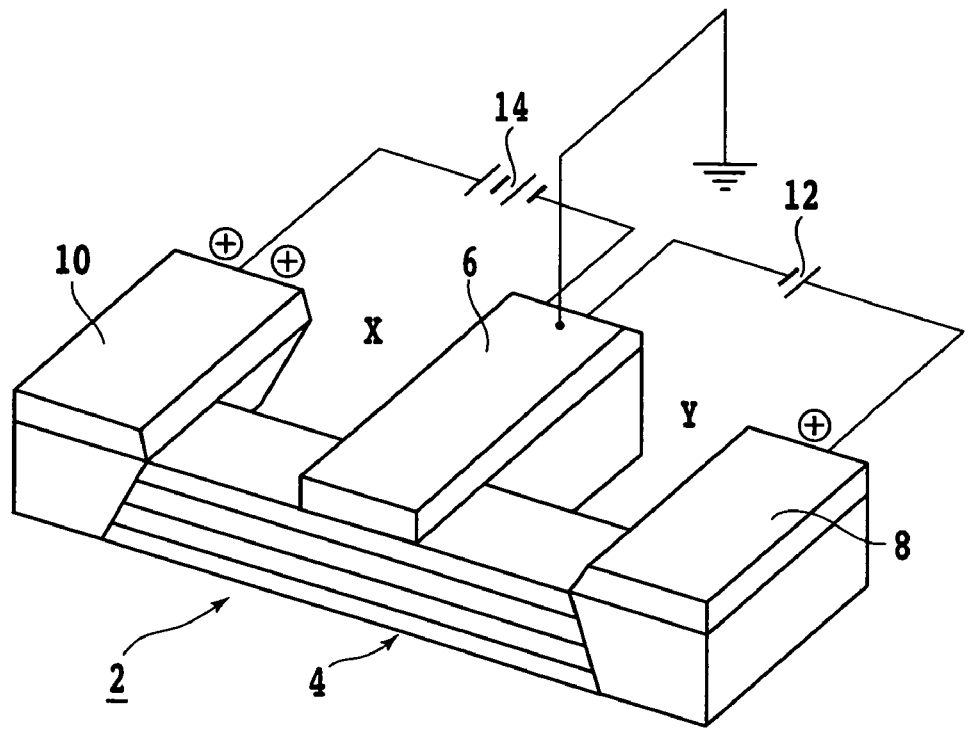
FIG. 2 is a perspective view of a reproducing head according to a first preferred embodiment of the present invention.

Referring to FIG. 2, there is shown a perspective view of a reproducing head 2 according to a first preferred embodiment of the present invention. The reproducing head 2 includes a read element 4 such as a spin valve magnetoresistive element, a pair of electrodes 8 and 10 provided on the opposite ends of the read element 4, and a ground electrode 6 provided between the electrodes 8 and 10. A first constant current (sense current) is passed between the electrode 8 and the ground electrode 6 by a constant current circuit 12. A second constant current (sense current) is passed between the electrode 10 and the ground electrode 6 by a constant current circuit 14. In this preferred embodiment, the second constant current is twice the first constant current. In the reproducing head 2 according to this preferred embodiment, the ground electrode 6 is provided between the electrodes 8 and 10, so that a reproducing head X can be defined between the electrode 10 and the ground electrode 6, and a reproducing head Y can be defined between the electrode 8 and the ground electrode 6. Accordingly, the core width of the reproducing head according to the present invention can be reduced to ½ or less as compared with the prior art.

Figure 3:
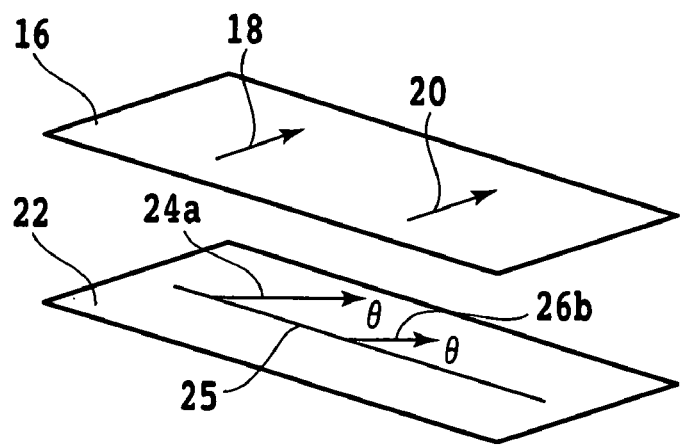
FIG. 3 is a perspective view showing a first case of the magnetization direction in a free layer of the reproducing head according to the first preferred embodiment.

FIG. 3 shows a first case of the magnetization directions in a pinned layer 16 and in a free layer 22 of the reproducing head 2 according to the first preferred embodiment. The magnetization direction 18 in the pinned layer 16 in the head X and the magnetization direction 20 in the pinned layer 16 in the head Y are fixed to a direction along the height of the read element 4. The magnetization direction in the free layer 22 is influenced by a signal magnetic field recorded on the magnetic disk, and changes to a rightward or leftward direction with respect to a straight line 25 parallel to a direction along the width of the read element 4.

The sense current is passed through the head X in the counterclockwise direction, and the sense current is passed through the head Y in the clockwise direction. In the head X, the rightward magnetization direction 24a is defined as "0" and the leftward magnetization direction 24b is defined as "1". On the other hand, in the head Y, the leftward magnetization direction 26a is defined as "0" and the rightward magnetization direction 26b is defined as "1". Accordingly, in the first case shown in FIG. 3, the binary values for the heads X and Y are 0 and 1, respectively.

Figure 4A:
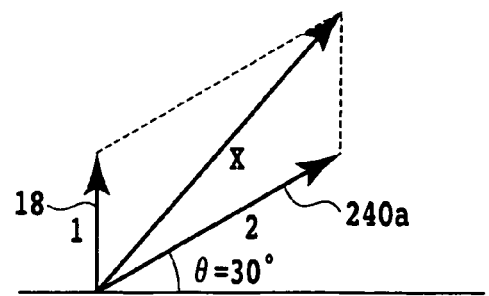
FIGS. 4A to 4C are diagrams for illustrating a vector synthesizing method in the first case shown in FIG. 3.
Figure 4B:
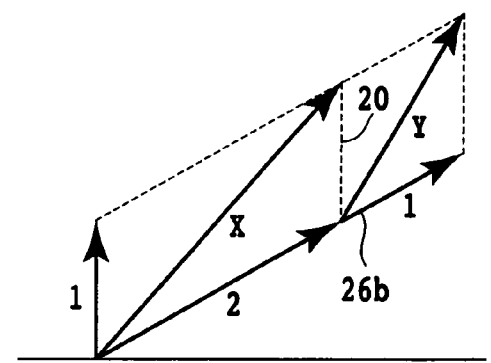
Figure 4C:
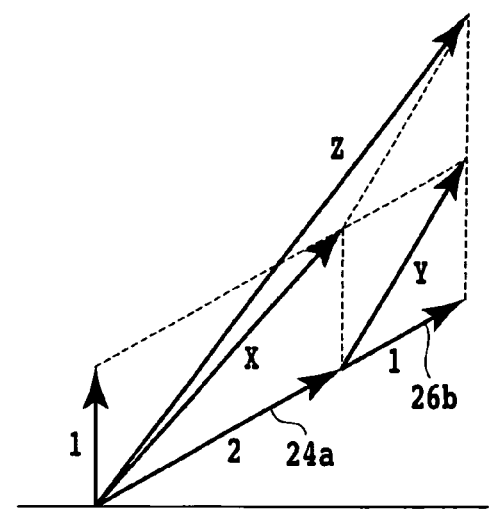

FIGS. 4A to 4C show a vector synthesizing method for the magnetization directions 24a and 24b in the first case shown in FIG. 3. It is assumed that the angle of inclination θ of the magnetization direction with respect to the straight line 25 in the free layer 22 is 30°. Further, it is assumed that the magnitude of magnetization in the head X in the pinned layer 16 is 1, that the magnitude of magnetization in the head Y in the pinned layer 16 is 1, that the magnitude of magnetization in the head X in the free layer 22 is 2, and that the magnitude of magnetization in the head Y in the free layer 22 is 1.

As shown in FIG. 4A, a parallelogram is formed from the magnetization directions 18 and 24a in the pinned layer 16 and the free layer 22 in the head X. The diagonal of this parallelogram becomes an output (vector X) from the head X. As shown in FIG. 4B, the magnetization direction 26b in the free layer 22 in the head Y is the same as the magnetization direction 24a in the free layer 22 in the head X. Accordingly, the magnetization direction 26b is placed on the extension of the magnetization direction 24a to form a parallelogram from this magnetization direction 26b and the magnetization direction 20 in the pinned layer 16. The diagonal of this parallelogram becomes an output (vector Y) from the head Y. As shown in FIG. 4C, a parallelogram is formed from the vectors X and Y. The diagonal of this parallelogram becomes a synthetic output Z from the reproducing head 2.

Figure 5:
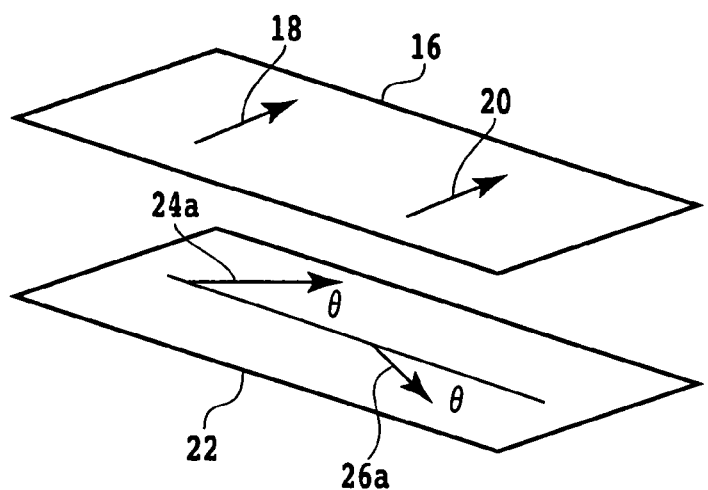
FIG. 5 is a perspective view showing a second case of the magnetization direction in the free layer according to the first preferred embodiment.
Figure 6:
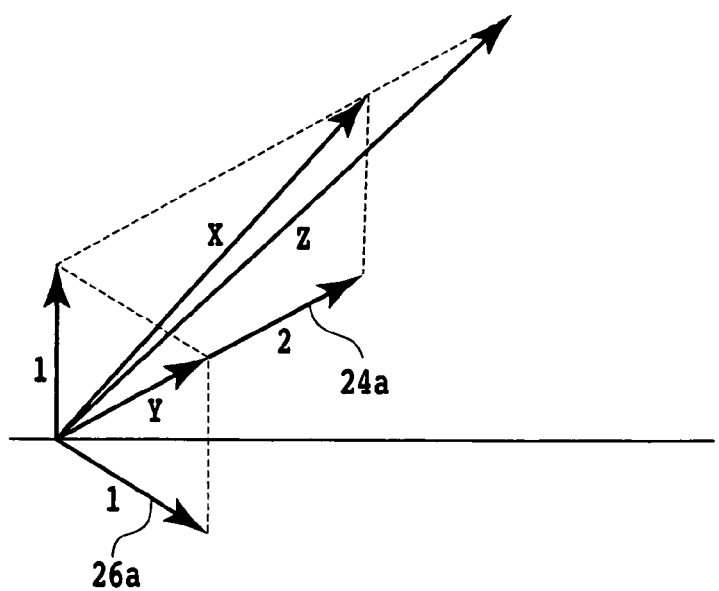
FIG. 6 is a diagram for illustrating a vector synthesizing method in the second case shown in FIG. 5.

FIG. 5 shows a second case of the magnetization direction in the free layer 22. In the second case, the magnetization direction in the head X in the free layer 22 is the rightward magnetization direction 24a, whose binary value is "0", and the magnetization direction in the head Y in the free layer 22 is the leftward magnetization direction 26a, whose binary value is "0". FIG. 6 shows a vector synthesizing method in the second case shown in FIG. 5.

Figure 7:
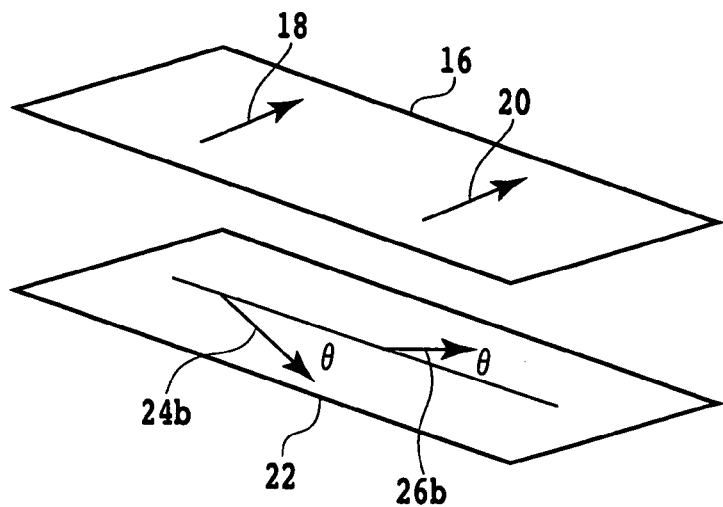
FIG. 7 is a perspective view showing a third case of the magnetization direction in the free layer according to the first preferred embodiment.
Figure 8:
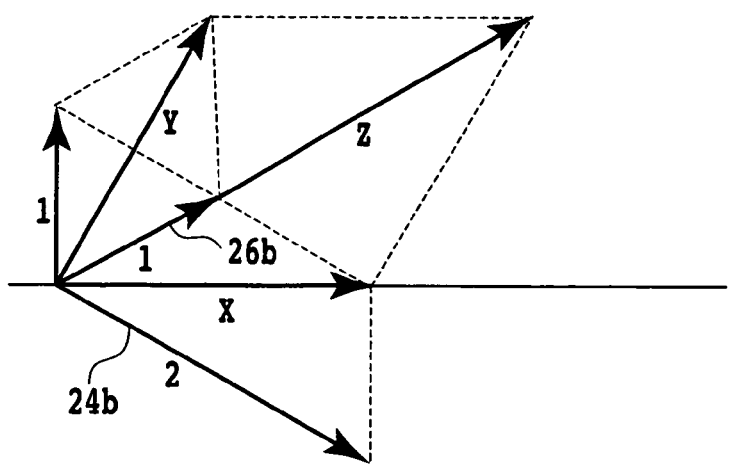
FIG. 8 is a diagram for illustrating a vector synthesizing method in the third case shown in FIG. 7.

FIG. 7 shows a third case of the magnetization direction in the free layer 22. In the third case, the magnetization direction in the head X in the free layer 22 is the leftward magnetization direction 24b, whose binary value is "1", and the magnetization direction in the head Y in the free layer 22 is the rightward magnetization direction 26b, whose binary value is "1". FIG. 8 shows a vector synthesizing method in the third case shown in FIG. 7.

Figure 9:
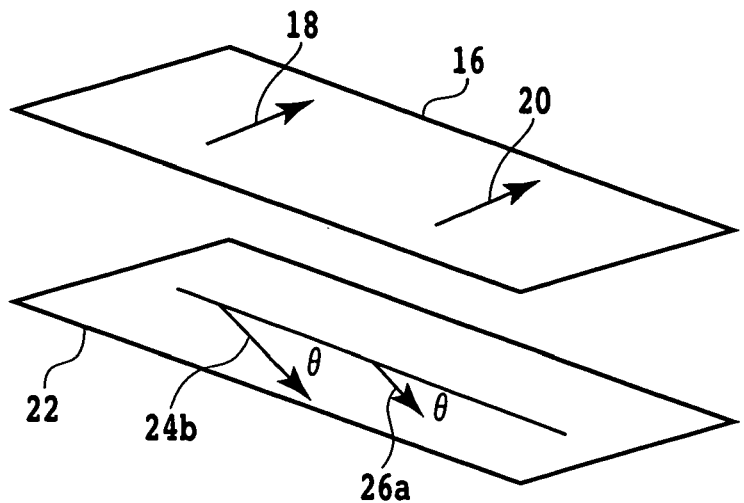
FIG. 9 is a perspective view showing a fourth case of the magnetization direction in the free layer according to the first preferred embodiment.
Figure 10:
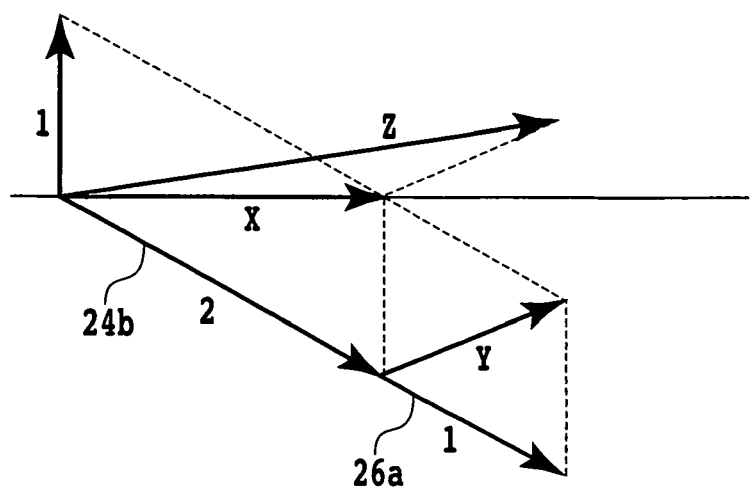
FIG. 10 is a diagram for illustrating a vector synthesizing method in the fourth case shown in FIG. 9.

FIG. 9 shows a fourth case of the magnetization direction in the free layer 22. In the fourth case, the magnetization direction in the head X in the free layer 22 is the leftward magnetization direction 24b, whose binary value is "1", and the magnetization direction in the head Y in the free layer 22 is the leftward magnetization direction 26b, whose binary value is "0". FIG. 10 shows a vector synthesizing method in the fourth case shown in FIG. 9.

The relation between the signal outputs from the heads X and Y and the synthetic output Z (vector length or output level) is shown in Table 1.

TABLE 1

| X | Y | Z (vector length) * output level |
|---|---|---|
| 0 | 1 | 4.36 |
| 0 | 0 | 3.61 |
| 1 | 1 | 3.00 |
| 1 | 0 | 2.65 |

Figure 11:
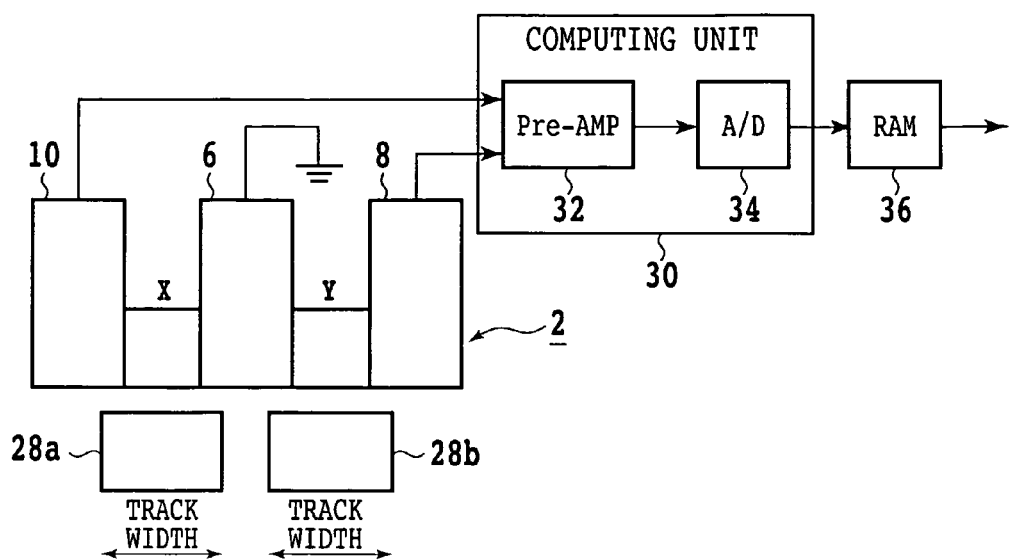
FIG. 11 is a schematic diagram showing a signal reproducing system for the reproducing head according to the first preferred embodiment.

Referring to FIG. 11, there is shown a schematic diagram of a signal reproducing system for the reproducing head 2 according to the first preferred embodiment. The core width (sense region) of the head X is set smaller than the width of a track 28a, and the core width (sense region) of the head Y is set smaller than the width of a track 28b. Outputs from the electrodes 8 and 10 are input into a computing unit 30, in which a vector synthesizing operation is performed. The computing unit 30 includes a preamplifier 32 and an A/D converter 34 for converting an analog signal amplified by the preamplifier 32 into a digital signal.

A RAM 36 is provided to preliminarily store the relation between a synthetic value computed by the computing unit 30 and the outputs from the electrodes 8 and 10, which relation has such a correspondence as shown in Table 1. Accordingly, by inputting the vector value synthesized by the computing unit 30 into the RAM 36, the signal outputs from the heads X and Y can be identified from Table 1.

Figure 12:
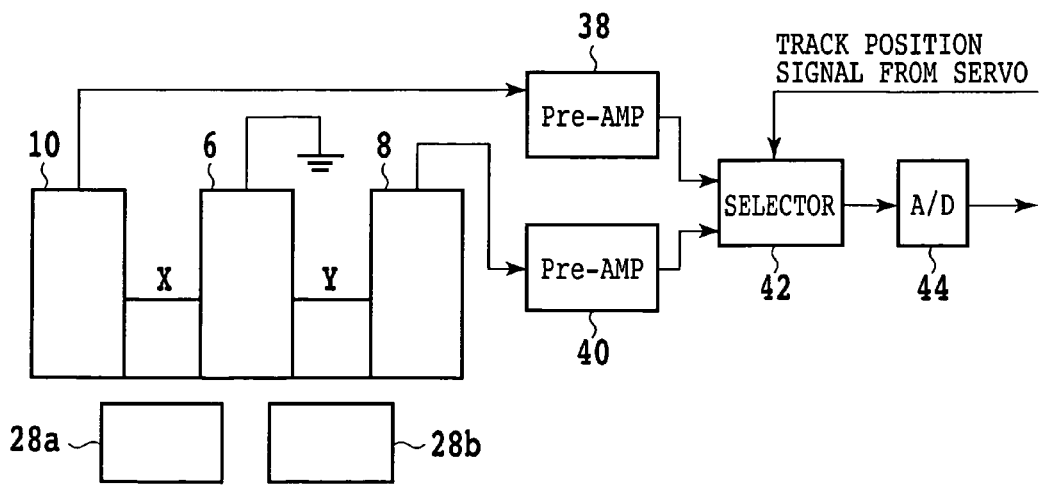
FIG. 12 is a schematic diagram showing another signal reproducing system for the reproducing head according to the first preferred embodiment.

Referring to FIG. 12, there is shown a schematic diagram of another preferred embodiment of the signal reproducing system. In this preferred embodiment, an output from the electrode 8 is input into a preamplifier 40, and an output from the electrode 10 is input into a preamplifier 38. The preamplifiers 38 and 40 are connected to a selector 42 for selecting either the output from the head X or the output from the head Y according to a track position signal input from a servo control system. Accordingly, a recorded signal can be reproduced in time sequence by the two heads X and Y. An output from the selector 42 is converted into a digital signal by an A/D converter 44. Unlike the preferred embodiment shown in FIG. 11, it is not necessary to perform the vector synthesizing operation in the computing unit 30. However, the two preamplifiers 38 and 40 are necessary in this preferred embodiment.

Figure 13:
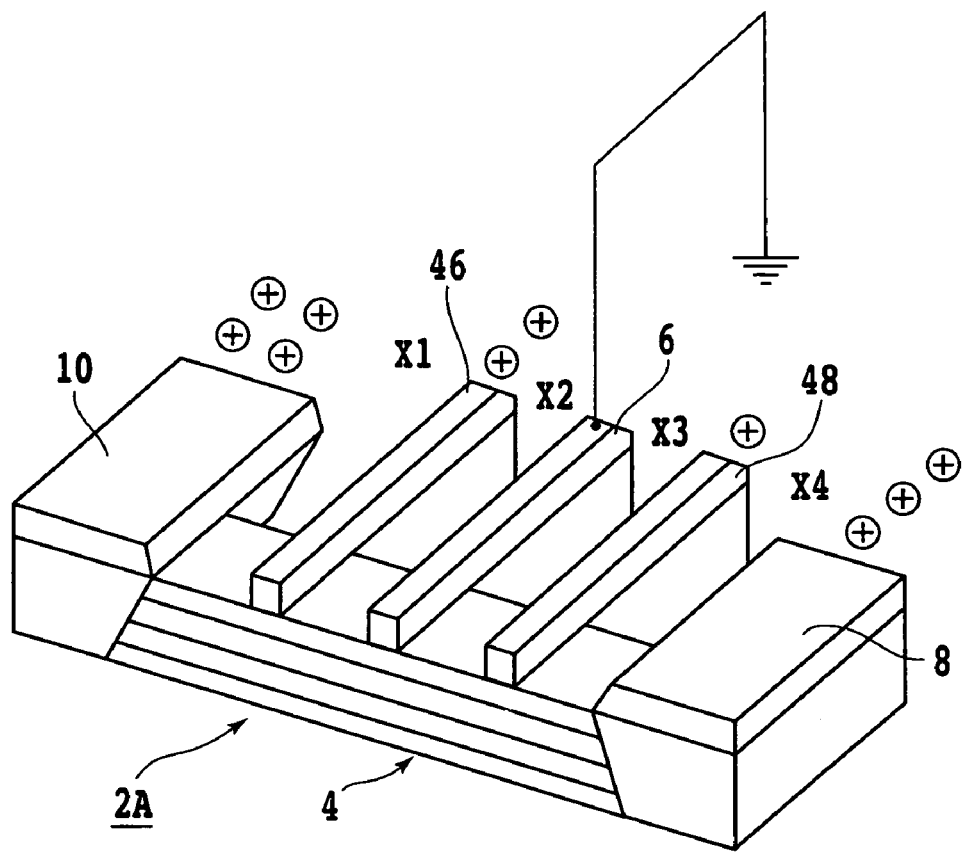
FIG. 13 is a perspective view of a reproducing head according to a second preferred embodiment of the present invention.

Referring to FIG. 13, there is shown a perspective view of a reproducing head 2A according to a second preferred embodiment of the present invention. In the reproducing head 2A according to this preferred embodiment, an intermediate electrode 46 is provided between the electrode 10 and the ground electrode 6, and another intermediate electrode 48 is provided between the electrode 8 and the ground electrode 6, thereby providing substantially four reproducing heads X1 to X4.

Although not especially shown, a first constant current (sense current) is passed between the intermediate electrode 48 and the ground electrode 6 by first constant current means, and a second constant current (sense current) different from the first constant current is passed between the intermediate electrode 46 and the ground electrode 6 by second constant current means. Preferably, the second constant current is twice the first constant current. Similarly, a third constant current (sense current) is passed between the electrode 8 and the ground electrode 6 by third constant current means, and a fourth constant current (sense current) is passed between the electrode 10 and the ground electrode 6. Preferably, the third constant current is three times the first constant current.

Figure 14:
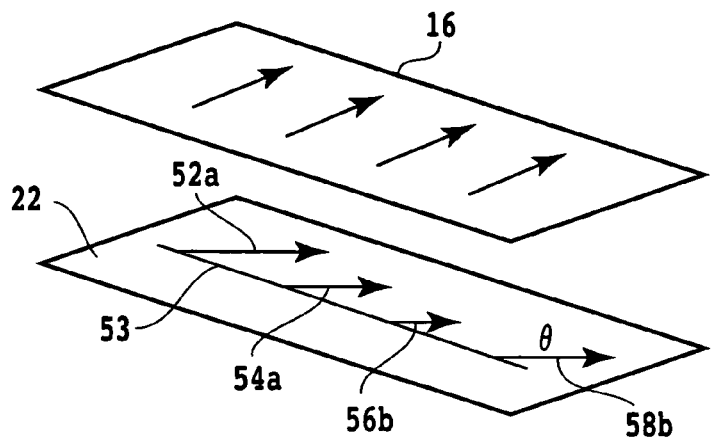
FIG. 14 is a perspective view showing a first case of the magnetization direction in a free layer of the reproducing head according to the second preferred embodiment.

FIG. 14 shows a first case of the magnetization directions in a pinned layer 16 and in a free layer 22 of the reproducing head 2A according to the second preferred embodiment. As in the first preferred embodiment, the magnetization direction in the pinned layer 16 is fixed to a direction along the height of the read element 4. In the reproducing head 2A according to this preferred embodiment, the sense currents are passed through the heads X1 and X2 in the counterclockwise direction, and the sense currents are passed through the heads X3 and X4 in the clockwise direction. In the heads X1 and X2, the rightward magnetization direction with respect to a straight line 53 parallel to a direction along the width of the read element 4 is defined as "0", and the leftward magnetization direction with respect to the straight line 53 is defined as "1". In the heads X3 and X4, the leftward magnetization direction with respect to the straight line 53 is defined as "0", and the rightward magnetization direction with respect to the straight line 53 is defined as "1". Accordingly, in the first case shown in FIG. 14, the magnetization direction 52a in the head X1 is "0", the magnetization direction 54a in the head X2 is "0", the magnetization direction 56b in the head X3 is "1", and the magnetization direction 58b in the head X4 is "1".

Figure 15:
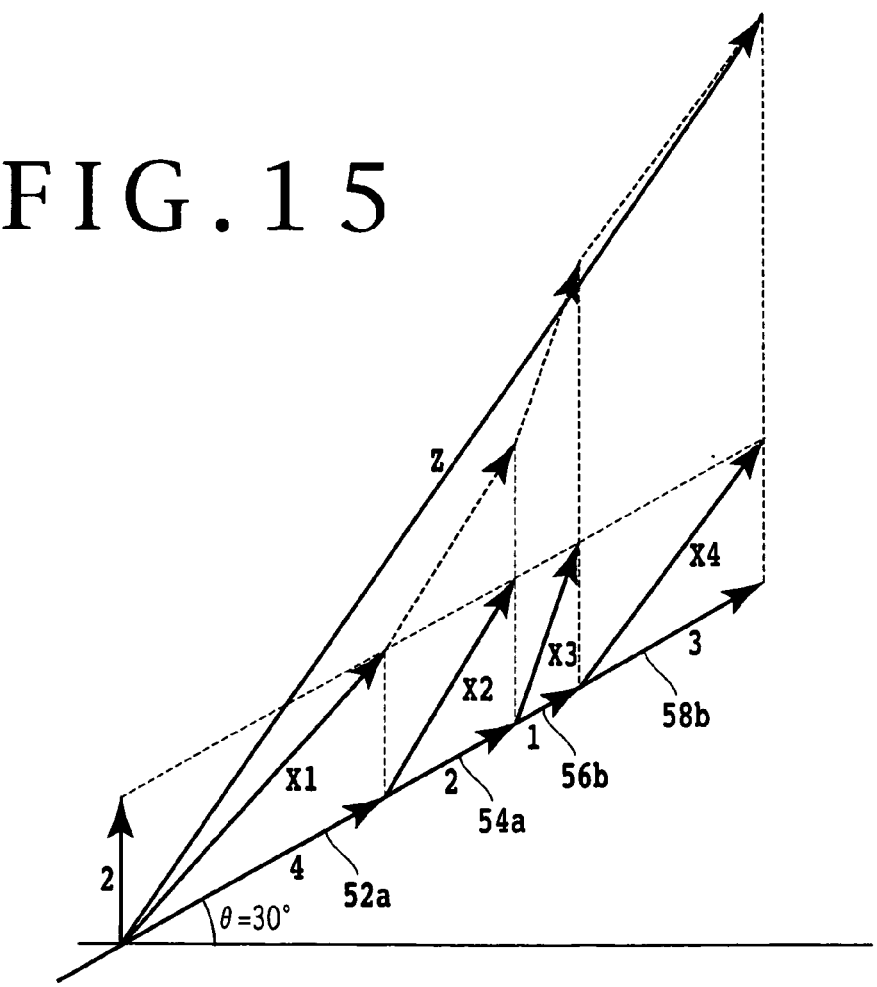
FIG. 15 is a diagram for illustrating a vector synthesizing method in the first case shown in FIG. 14.

FIG. 15 shows a vector synthesizing method for synthesizing the outputs from the heads X1 to X4 in the first case shown in FIG. 14. In this preferred embodiment, it is assumed that the angle of inclination θ of the magnetization direction with respect to the straight line 53 in the free layer 22 is 30°. Further, it is assumed that the magnitude of magnetization in the pinned layer 16 is 1 and that the magnitudes of magnetization in the heads X1, X2, X3, and X4 in the free layer 22 are 4, 2, 1, and 3, respectively. As shown in FIG. 15, a synthetic output Z from the reproducing head 2A can be obtained in the first case shown in FIG. 14.

Figure 16:
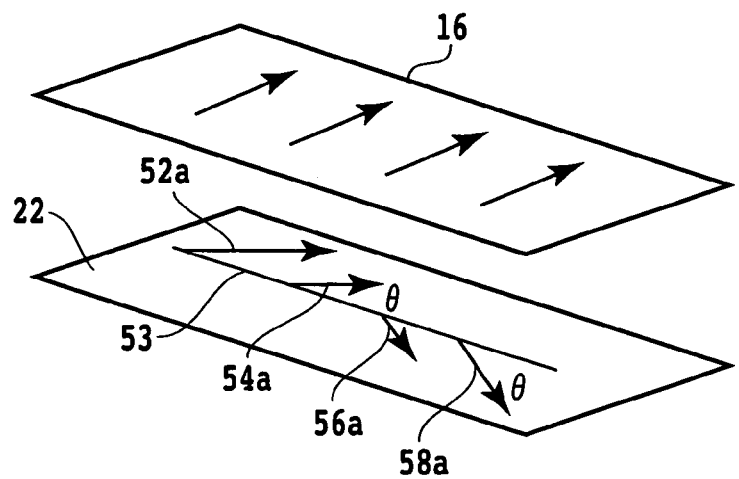
FIG. 16 is a perspective view showing a second case of the magnetization direction in the free layer according to the second preferred embodiment.
Figure 17:
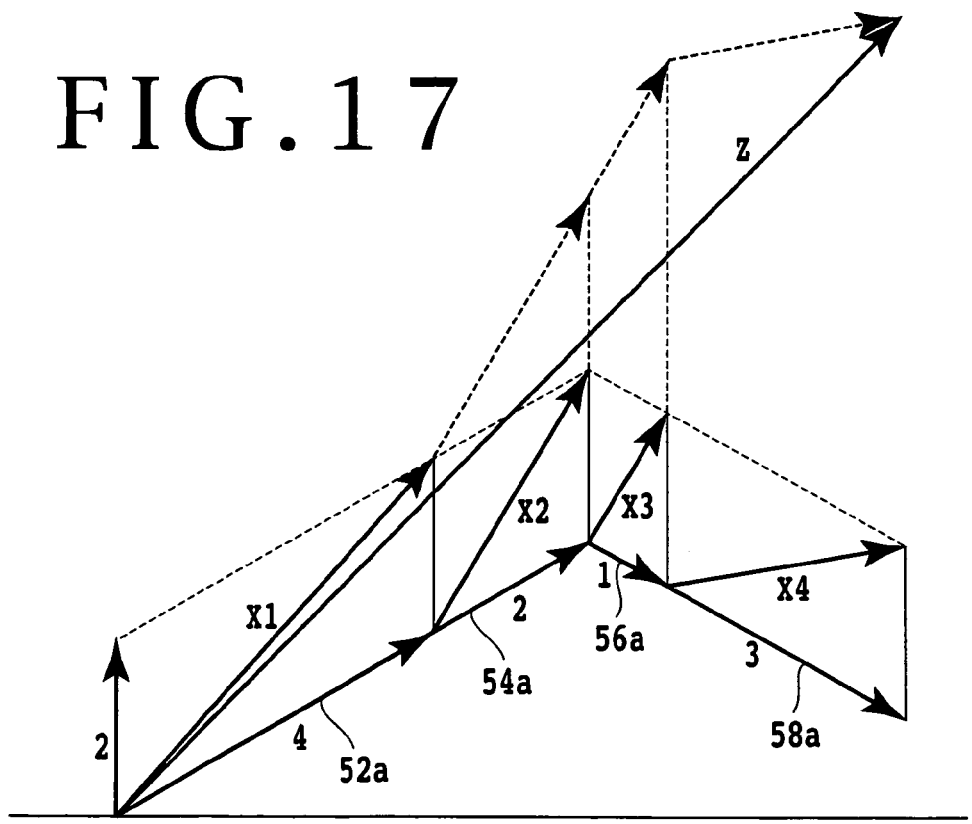
FIG. 17 is a diagram for illustrating a vector synthesizing method in the second case shown in FIG. 16.

FIG. 16 shows a second case of the magnetization direction in the free layer 22 in the reproducing head 2A. In the second case shown in FIG. 16, the magnetization direction 52a in the head X1 is "0", the magnetization direction 54a in the head X2 is "0", the magnetization direction 56a in the head X3 is "0", and the magnetization direction 58a in the head X4 is "0". In the second case shown in FIG. 16, a synthetic output Z from the reproducing head 2A can be obtained by a vector synthesizing method shown in FIG. 17.

Figure 18:
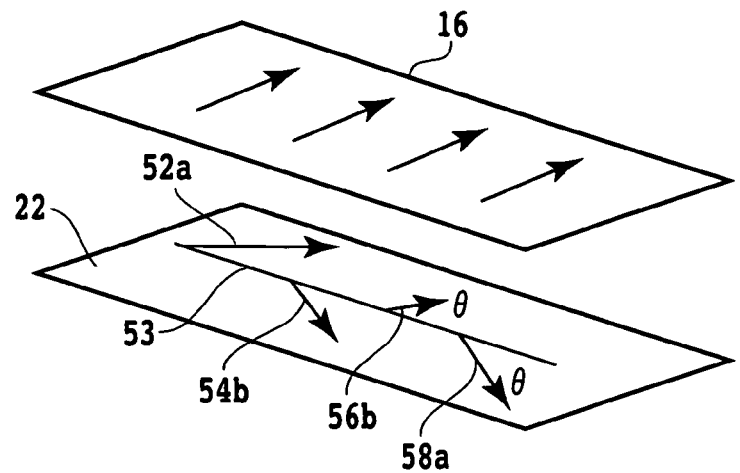
FIG. 18 is a perspective view showing a third case of the magnetization direction in the free layer according to the second preferred embodiment.
Figure 19:
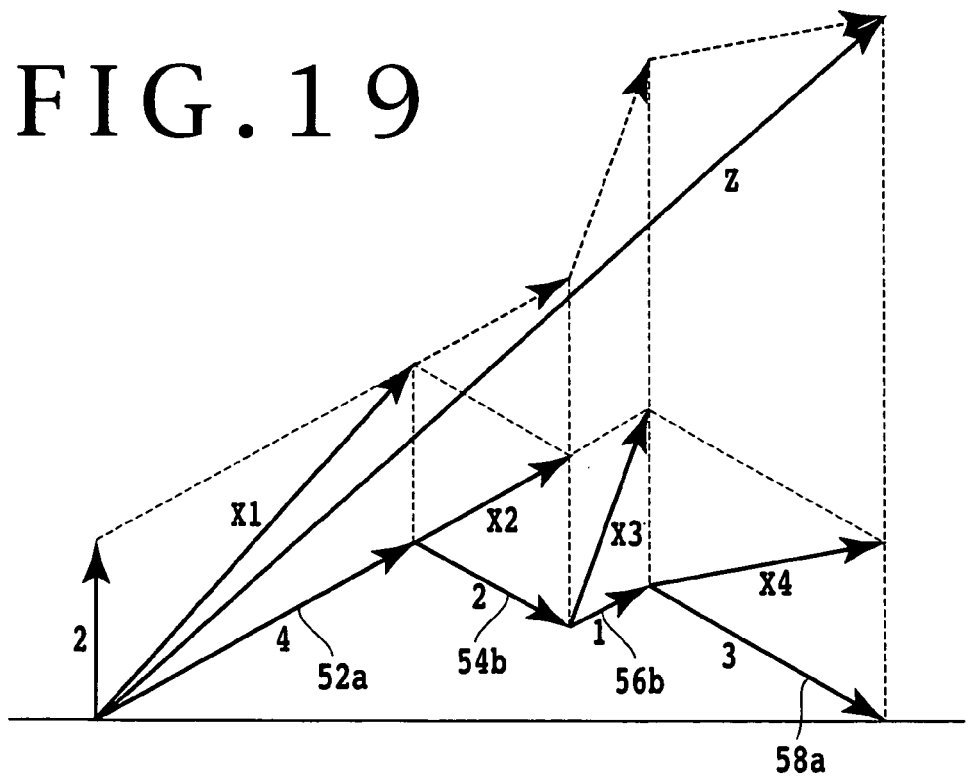
FIG. 19 is a diagram for illustrating a vector synthesizing method in the third case shown in FIG. 18.

FIG. 18 shows a third case of the magnetization direction in the free layer 22 in the reproducing head 2A. In this case, the magnetization direction 52a in the head X1 is "0", the magnetization direction 54b in the head X2 is "1", the magnetization direction 56b in the head X3 is "1", and the magnetization direction 58a in the head X4 is "0". In the third case shown in FIG. 18, a synthetic output Z from the reproducing head 2A can be obtained by a vector synthesizing method shown in FIG. 19.

Figure 20:
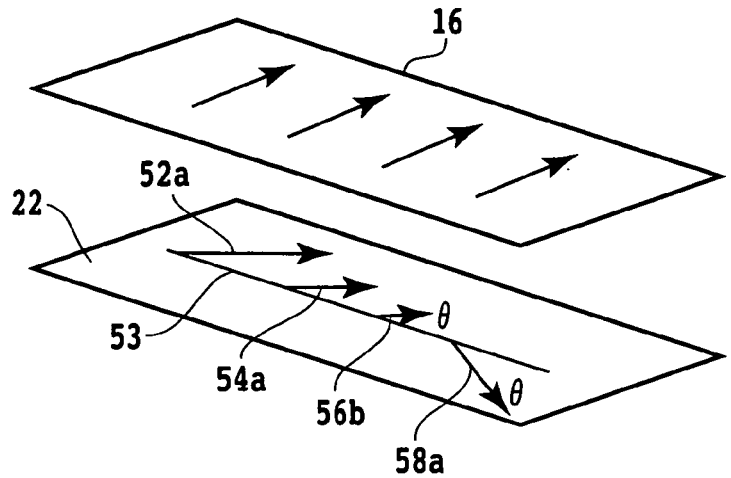
FIG. 20 is a perspective view showing a fourth case of the magnetization direction in the free layer according to the second preferred embodiment.
Figure 21:
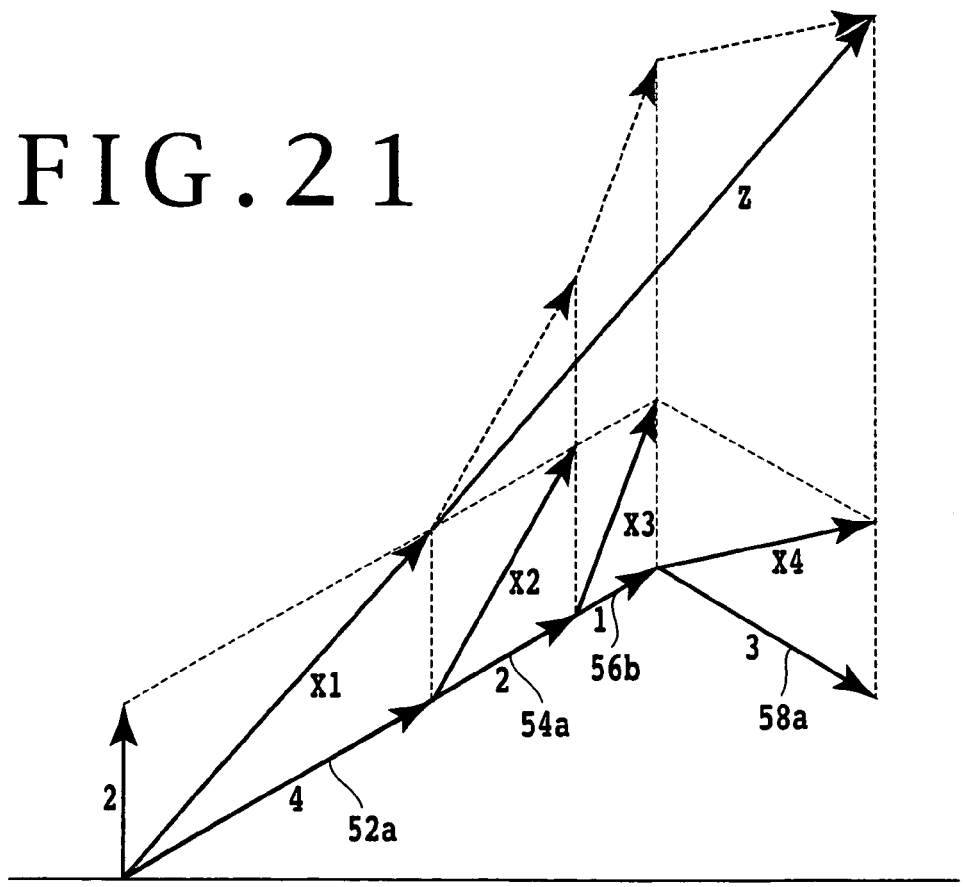
FIG. 21 is a diagram for illustrating a vector synthesizing method in the fourth case shown in FIG. 20.

FIG. 20 shows a fourth case of the magnetization direction in the free layer 22 in the reproducing head 2A. In this case, the magnetization direction 52a in the head X1 is "0", the magnetization direction 54a in the head X2 is "0", the magnetization direction 56b in the head X3 is "1", and the magnetization direction 58a in the head X4 is "0". In the fourth case shown in FIG. 20, a synthetic output Z from the reproducing head 2A can be obtained by a vector synthesizing method shown in FIG. 21.

Similarly, the other combinations of the outputs from the heads X1 to X4 can be provided, and synthetic outputs Z for totally 16 combinations of the magnetization directions in the free layer 22 in the reproducing head 2A can be obtained. The result of the synthetic outputs Z thus obtained is shown in Table 2. Each synthetic output Z indicates the vector length or output level.

TABLE 2

| X1 | X2 | X3 | X4 | Z(vector length) * output level | duplicated output | Z1 (X3) | identification address |
|---|---|---|---|---|---|---|---|
| 0 | 0 | 1 | 1 | 15.62 | — | — | — |
| 0 | 0 | 0 | 1 | 14.80 | — | — | — |
| 0 | 1 | 1 | 1 | 14.00 | — | — | — |
| 0 | 1 | 0 | 1 | 13.23 | A | 1.74 | 0 |
| 0 | 0 | 1 | 0 | 13.23 | A | 2.65 | 1 |
| 0 | 0 | 0 | 0 | 12.49 | B | 1.74 | 0 |
| 0 | 1 | 1 | 0 | 11.79 | C | 2.65 | 1 |
| 0 | 1 | 0 | 0 | 11.14 | D | 1.74 | 0 |
| 1 | 0 | 1 | 1 | 12.49 | B | 2.65 | 1 |
| 1 | 0 | 0 | 1 | 11.79 | C | 1.74 | 0 |
| 1 | 1 | 1 | 1 | 11.14 | D | 2.74 | 1 |
| 1 | 1 | 0 | 1 | 10.54 | E | 1.74 | 0 |
| 1 | 0 | 1 | 0 | 10.54 | E | 2.65 | 1 |
| 1 | 0 | 0 | 0 | 10.00 | — | — | — |
| 1 | 1 | 1 | 0 | 9.54 | — | — | — |
| 1 | 1 | 0 | 0 | 9.17 | — | — | — |

It is apparent from Table 2 that there are five kinds of cases where the output level Z becomes the same value. It is therefore required to distinguish the signal outputs from the heads X1 to X4 in each of these five kinds of cases.

Figure 22:
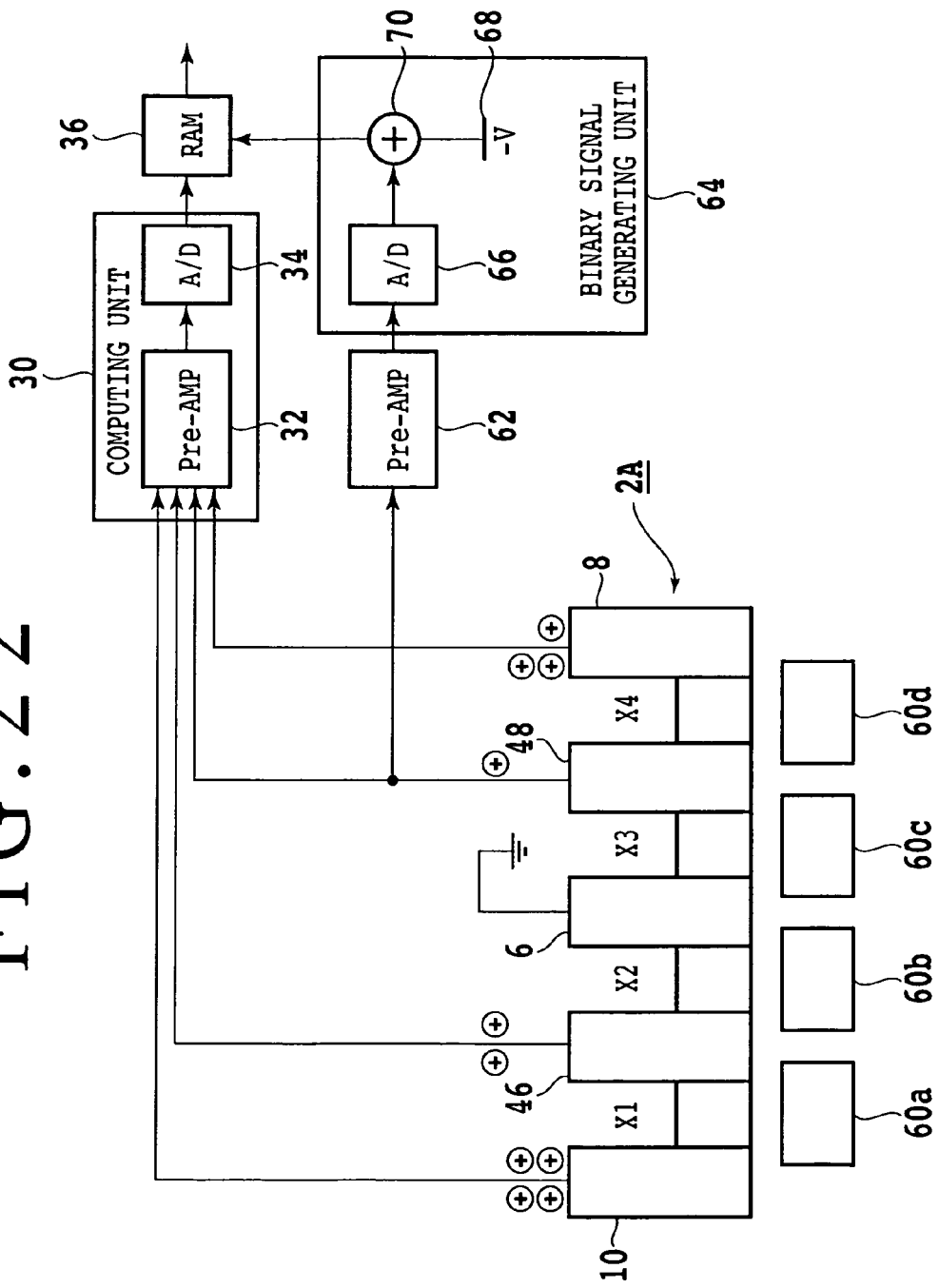
FIG. 22 is a schematic diagram showing a signal reproducing system for the reproducing head according to the second preferred embodiment.

Referring to FIG. 22, there is shown a schematic diagram of a signal reproducing system for the reproducing head 2A according to the second preferred embodiment. The heads X1 to X4 are arranged so as to read information recorded on four tracks 60a to 60d, respectively. Outputs from the electrodes 8 and 10 and the intermediate electrodes 46 and 48 are input into a computing unit 30 to perform a vector synthesizing operation for synthesizing the outputs from these electrodes 8, 10, 46, and 48. The computing unit 30 includes a preamplifier 32 and an A/D converter 34. A RAM 36 is provided to preliminarily store the relation between a synthetic value computed in the computing unit 30 and the outputs from the four electrodes 8, 10, 46, and 48, which relation has such a correspondence as shown in Table 2.

To distinguish the signal outputs from the heads X1 to X4 in each of the five kinds of cases where the synthetic output Z becomes the same value as shown by symbols A to E in Table 2, the output from the head X3, or the output from the intermediate electrode 48 is input into a preamplifier 62, and an analog signal amplified by the preamplifier 62 is input into a binary signal generating unit 64. The binary signal generating unit 64 includes an A/D converter 66 for converting the analog signal amplified by the preamplifier 62 into a digital signal. The output from the A/D converter 66 is shown at the column of Z1 (X3) in Table 2. An offset voltage 68, or −1.74 V is added to the values at the column of Z1 (X3) by an adder 70 to obtain data "0.00" and "0.91". These data "0.00" and "0.91" are rounded off to their nearest integers "0" and "1", respectively. These values "0" and "1" are additionally stored as identification address in the RAM 36. The duplicated synthetic outputs Z can be distinguished from each other according to the identification address stored in the RAM 36.

According to the present invention, it is possible to provide a reproducing head which can minimize the core width of a read element. Accordingly, it is possible to provide a magnetic disk drive which can attain high-speed reproduction of information recorded on a magnetic disk.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A reproducing head comprising:
   a read element;
   first and second electrodes provided at the opposite ends of said read element;
   a ground electrode provided between said first and second electrodes;
   first constant current means for passing a first constant current between said first electrode and said ground electrode;
   second constant current means for passing a second constant current different from said first constant current between said second electrode and said ground electrode;
   computing means connected to said first and second electrodes for synthesizing an output from said first electrode and an output from said second electrode; and
   storing means having a table showing the relation between a synthetic value computed by said computing means and the outputs from said first and second electrodes.

2. The reproducing head according to claim 1, wherein said second constant current is twice said first constant current.

3. The reproducing head according to claim 1, wherein said computing means comprises a preamplifier and an A/D converter.

4. A reproducing head comprising:
   a read element;
   first and second electrodes provided at the opposite ends of said read element;
   a ground electrode provided between said first and second electrodes;
   first constant current means for passing a first constant current between said first electrode and said ground electrode;
   second constant current means for passing a second constant current different from said first constant current between said second electrode and said ground electrode; and
   a selector connected to said first and second electrodes for selecting one of outputs from said first and second electrodes according to a track position signal.

5. A reproducing head comprising:
   a read element;
   first and second electrodes provided at the opposite ends of said read element;
   a ground electrode provided between said first and second electrodes;
   at least one intermediate electrode provided between said first and second electrodes;
   a plurality of constant current means for passing different constant currents between said ground electrode and said first electrode, between said ground electrode and said second electrode, and between said ground electrode and said intermediate electrode;
   computing means connected to said first and second electrodes and said intermediate electrode for synthesizing outputs from said first and second electrodes and said intermediate electrode;
   storing means having a table showing the relation between a synthetic value computed by said computing means and the outputs from said first and second electrodes and said intermediate electrode;

binary signal generating means connected to said intermediate electrode for generating a binary signal from the output from said intermediate electrode; and distinguishing means for inputting said binary signal to said storing means to distinguish addresses on said table in case that said synthetic value takes the same values.

6. The reproducing head according to claim 5, wherein said different constant currents comprise a minimum constant current and an integral multiple thereof.

7. The reproducing head according to claim 5, wherein said computing means comprises a preamplifier and an A/D converter.

8. The reproducing head according to claim 5, wherein said binary signal generating means comprises an A/D converter and offset voltage applying means.

9. A magnetic disk drive comprising:

a housing;

a magnetic disk rotatably accommodated in said housing, said magnetic disk having a plurality of tracks;

a head slider having a recording head for writing data to said magnetic disk and a reproducing head for reading data from said magnetic disk; and an actuator for moving said head slider across said tracks of said magnetic disk;

said reproducing head comprising:

a read element;

first and second electrodes provided at the opposite ends of said read element;

a ground electrode provided between said first and second electrodes;

first constant current means for passing a first constant current between said first electrode and said ground electrode;

second constant current means for passing a second constant current different from said first constant current between said second electrode and said ground electrode;

computing means connected to said first and second electrodes for synthesizing an output from said first electrode and an output from said second electrode; and storing means having a table showing the relation between a synthetic value computed by said computing means and the outputs from said first and second electrodes.

10. A magnetic disk drive comprising:

a housing;

a magnetic disk rotatably accommodated in said housing, said magnetic disk having a plurality of tracks;

a head slider having a recording head for writing data to said magnetic disk and a reproducing head for reading data from said magnetic disk; and an actuator for moving said head slider across said tracks of said magnetic disk;

said reproducing head comprising:

a read element;

first and second electrodes provided at the opposite ends of said read element;

a ground electrode provided between said first and second electrodes;

at least one intermediate electrode provided between said first and second electrodes;

a plurality of constant current means for passing different constant currents between said ground electrode and said first electrode, between said ground electrode and said second electrode, and between said ground electrode and said intermediate electrode;

computing means connected to said first and second electrodes and said intermediate electrode for synthesizing outputs from said first and second electrodes and said intermediate electrode;

storing means having a table showing the relation between a synthetic value computed by said computing means and the outputs from said first and second electrodes and said intermediate electrode;

binary signal generating means connected to said intermediate electrode for generating a binary signal from the output from said intermediate electrode; and distinguishing means for inputting said binary signal to said storing means to distinguish addresses on said table in case that said synthetic value takes the same values.

* * * * *